(12) United States Patent
Velazco

(10) Patent No.: US 10,707,966 B2
(45) Date of Patent: Jul. 7, 2020

(54) ULTRAFAST OMNIDIRECTIONAL WIRELESS DATA TRANSFER APPARATUS AND SYSTEM

(71) Applicant: CALIFORNIA INSTITUTE OF TECHNOLOGY, Pasadena, CA (US)

(72) Inventor: Jose E. Velazco, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/394,695

(22) Filed: Apr. 25, 2019

(65) Prior Publication Data
US 2019/0349087 A1 Nov. 14, 2019

Related U.S. Application Data

(60) Provisional application No. 62/671,050, filed on May 14, 2018.

(51) Int. Cl.
*H04B 10/112* (2013.01)
*H04B 10/114* (2013.01)
(Continued)

(52) U.S. Cl.
CPC ......... *H04B 10/40* (2013.01); *H04B 10/1123* (2013.01); *H04B 10/1129* (2013.01);
(Continued)

(58) Field of Classification Search
CPC .............................................. H04B 10/11–118
(Continued)

(56) References Cited

U.S. PATENT DOCUMENTS

| | | | | |
|---|---|---|---|---|
| RE32,521 E | * | 10/1987 | Fergason | G02F 1/1393 349/1 |
| 4,975,926 A | * | 12/1990 | Knapp | H04B 1/707 375/141 |

(Continued)

OTHER PUBLICATIONS

Boyraz et al: "Omnidirectional Inter-Satellite Optical Communication (ISOC), ISOC Enables Gigabit Communication Between CubeSats", https://ntrs.nasa.gov/search.jsp?R=20180002972, Mar. 3, 2017, two pages (Year: 2017).*

(Continued)

*Primary Examiner* — Li Liu
(74) *Attorney, Agent, or Firm* — Steinfl + Bruno LLP

(57) ABSTRACT

An ultrafast omnidirectional wireless data transfer apparatus and system. The ultrafast omnidirectional wireless data transfer apparatus includes an array of laser diodes, an array of fast detectors, and a connector for connecting to a sensor, a computer, and/or a network. The array of laser diodes, and the array of fast detectors are housed in a multifaceted geometry in order to provide communication coverage in all directions. In one aspect, each laser in the array of laser diodes operates at different wavelengths. In another aspect, the ultrafast omnidirectional wireless data transfer apparatus includes field programmable gate arrays. In yet another aspect, the ultrafast omnidirectional wireless data transfer apparatus includes an array of collimators that are connected to an optical combiner. In yet another alternate aspect, an ultrafast omnidirectional wireless data transfer system includes several ultrafast omnidirectional wireless data transfer apparatuses which are optically coupled together and communicate in different wavelengths.

17 Claims, 7 Drawing Sheets

(51) Int. Cl.
  *H04B 10/40* (2013.01)
  *H04J 14/02* (2006.01)
  *H04B 10/2575* (2013.01)
  *H04W 16/30* (2009.01)

(52) U.S. Cl.
  CPC ..... *H04B 10/1143* (2013.01); *H04B 10/1149* (2013.01); *H04B 10/2575* (2013.01); *H04J 14/02* (2013.01); *H04W 16/30* (2013.01); *H04B 2210/006* (2013.01)

(58) Field of Classification Search
  USPC .................................................. 398/118–131
  See application file for complete search history.

(56) References Cited

U.S. PATENT DOCUMENTS

| | | | | |
|---|---|---|---|---|
| 5,539,393 | A * | 7/1996 | Barfod | G06Q 10/087 340/10.6 |
| 5,724,168 | A * | 3/1998 | Oschmann | H03F 3/087 398/127 |
| 5,757,528 | A * | 5/1998 | Bradley | H04B 10/40 398/129 |
| 5,880,867 | A * | 3/1999 | Ronald | H04B 10/1149 370/310 |
| 6,424,442 | B1 * | 7/2002 | Gfeller | H04B 10/40 398/135 |
| 7,873,278 | B2 * | 1/2011 | Baiden | H04B 13/02 367/131 |
| 7,953,326 | B2 * | 5/2011 | Farr | H04B 13/02 398/104 |
| 9,438,338 | B1 * | 9/2016 | Chan | H04B 10/11 |
| 9,455,787 | B2 * | 9/2016 | Byers | H04B 10/502 |
| 9,515,729 | B2 * | 12/2016 | Murshid | H04B 10/11 |
| 10,581,525 | B2 | 3/2020 | Velazco | |
| 2001/0043379 | A1 * | 11/2001 | Bloom | H04B 10/1125 398/128 |
| 2003/0117623 | A1 * | 6/2003 | Tokhtuev | G01N 21/53 356/338 |
| 2006/0239689 | A1 * | 10/2006 | Ashdown | H04B 10/1141 398/130 |
| 2007/0127926 | A1 * | 6/2007 | Marioni | H04B 10/1121 398/118 |
| 2010/0034540 | A1 * | 2/2010 | Togashi | H04B 10/116 398/118 |
| 2010/0054746 | A1 * | 3/2010 | Logan | H04B 10/25754 398/115 |
| 2010/0260503 | A1 * | 10/2010 | Zhovnirovsky | H04B 10/803 398/118 |
| 2012/0206913 | A1 | 8/2012 | Jungwirth et al. | |
| 2012/0275796 | A1 * | 11/2012 | Yokoi | H04B 10/116 398/130 |
| 2013/0223846 | A1 * | 8/2013 | Joseph | H04B 10/11 398/119 |
| 2014/0003817 | A1 * | 1/2014 | Roberts | H04B 10/11 398/74 |
| 2014/0248058 | A1 * | 9/2014 | Simpson | H04B 10/112 398/104 |
| 2014/0270749 | A1 | 9/2014 | Miniscalco et al. | |
| 2014/0294399 | A1 | 10/2014 | Makowski et al. | |
| 2014/0376001 | A1 | 12/2014 | Swanson | |
| 2015/0009485 | A1 | 1/2015 | Mheen et al. | |
| 2015/0282282 | A1 * | 10/2015 | Breuer | H05B 37/0272 315/152 |
| 2015/0298827 | A1 | 10/2015 | Nguyen et al. | |
| 2015/0372769 | A1 * | 12/2015 | Farr | H04B 10/80 398/104 |
| 2016/0043800 | A1 | 2/2016 | Kingsbury et al. | |
| 2016/0173199 | A1 * | 6/2016 | Gupta | H04B 10/11 398/127 |
| 2016/0204866 | A1 | 7/2016 | Boroson et al. | |
| 2016/0226584 | A1 | 8/2016 | Chalfant, III | |
| 2018/0003837 | A1 * | 1/2018 | Morris | G01V 1/22 |
| 2018/0122978 | A1 * | 5/2018 | Khatibzadeh | H01L 31/167 |
| 2019/0122593 | A1 * | 4/2019 | Guillama | G06T 11/00 |
| 2019/0229805 | A1 | 7/2019 | Velazco | |

OTHER PUBLICATIONS

"Omnidirectional Inter-Satellite Optical Communicator (ISOC); ISOC Enables Gigabit Communication Between CubeSats" NASAfacts, Mar. 3, 2017. 2 pages. https://ntrs.nasa.gov/search.jsp?R=20180002972 2019-09-04T23:45:56+00:00Z.

Non-Final Office Action for U.S. Appl. No. 16/218,394, filed Dec. 12, 2018 on behalf of California Institute of Technology, dated Sep. 13, 2019. 24 pages.

Velazco et al. "High data rate inter-satellite Omnidirectional Optical Communicator", 32nd Annual AIAA/USU Conference on Small Satellites, Aug. 4-9, 2018. 5 pages.

Notice of Allowance for U.S. Appl. No. 16/218,394, filed Dec. 12, 2018 on behalf of California Institute of Technology, dated Jan. 7, 2020. 11 Pages.

* cited by examiner

ULTRAFAST OMNIDIRECTIONAL WIRELESS DATA TRANSFER APPARATUS AND SYSTEM

CROSS-REFERENCE TO RELATED APPLICATIONS

The present application claims priority to U.S. Provisional Patent Application No. 62/671,050 filed on May 14, 2018, entitled "A New Ultrafast Omnidirectional Wireless Data Transfer System", the contents of which are herein incorporated by reference in their entirety.

The present application may be related to U.S. patent application Ser. No. 16/218,394 filed on Dec. 12, 2018, entitled "Method and Apparatus for Omnidirectional Optical Communication", the contents of which are herein incorporated by reference in their entirety.

FEDERAL SUPPORT STATEMENT

The invention described herein was made in the performance of work under a NASA contract NNN12AA01C, and is subject to the provisions of Public Law 96-517 (35 USC 202) in which the Contractor has elected to retain title.

BACKGROUND

(1) Technical Field

The present teachings generally relate to wireless data communications, and more specifically to an ultrafast omnidirectional wireless data transfer system.

(2) Background

It is estimated that for future communication applications such as wireless communications between wireless devices, cars, high data rate WiFi, direct intra-smartphone communications, drone communications, the internet of things, and smart cities, there will be a need for a new paradigm shift in high data rate multiple-link communications system.

Accordingly, there is a need for an ultrafast wireless data transfer apparatus and system that will allow a drastic increase in data transfer speeds, where up to terabit per second wireless data transfer rates can be achieved in an omnidirectional manner.

SUMMARY

Various embodiments of an ultrafast omnidirectional wireless data transfer apparatus and system are disclosed.

In one disclosed embodiment, an ultrafast omnidirectional wireless data transfer device includes a fast processor chip and a set of optical transceivers suitably located within the device so as to allow omnidirectional coverage. The fast processor chip may be a field programmable gate array (FPGA), microcontroller, or single-board-computer. The ultrafast omnidirectional wireless data transfer device offers full spherical coverage of the surroundings by using a multifaceted structure with each facet holding a transceiver. Each transceiver includes an array of lasers and detectors operating at distinct wavelengths. The operation at distinct wavelengths enables data transfer rates of hundreds of gigabits per second. Further, the ultrafast omnidirectional wireless data transfer device enables up to terabit per second data transfer in all directions.

An ultrafast omnidirectional wireless data transfer system includes a group of the ultrafast omnidirectional wireless data devices that are in communication. The data rate achieved in the ultrafast omnidirectional wireless data transfer system are three to four orders of magnitude higher than any current data transfer technology such as WiFi or Bluetooth. Ultrafast data transfer rate can be, for example, 1 gigabit per second to 100 gigabits per second.

In certain embodiments, the ultrafast omnidirectional wireless data transfer device is miniaturized by using integrated photonics to render miniature optical communicators that can be fitted into smartphones, appliances, cameras, and laptops.

In an advantageous embodiment, the ultrafast omnidirectional wireless data transfer system provides terabit per second communications for future terrestrial applications such as wireless communications between cars, high data rate WiFi, direct intra-smartphone communications, drone communications, the internet of things, and smart cities.

In an alternate embodiment, a ultrafast omnidirectional wireless data transfer apparatus is presented, comprising a multifaceted structure, a plurality of laser diodes, a plurality of optical collimators, an RF splitter connected to each of the laser diodes, and an optical combiner connected to each of the optical collimators, wherein the plurality of laser diodes, the plurality of optical collimators, the RF splitter and the optical combiner act, in combination, to provide ultrafast data communication in an omnidirectional manner.

BRIEF DESCRIPTION OF THE DRAWINGS

The disclosed apparatus, in accordance with one or more various embodiments, are described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

DETAILED DESCRIPTION

The disclosed ultrafast omnidirectional wireless data transfer system includes a fast processor chip and a set of optical transceivers suitably located within the device so as to allow omnidirectional coverage. The description of figures below provides further details of the ultrafast omnidirectional wireless data transfer apparatus and system.

Figure 1:
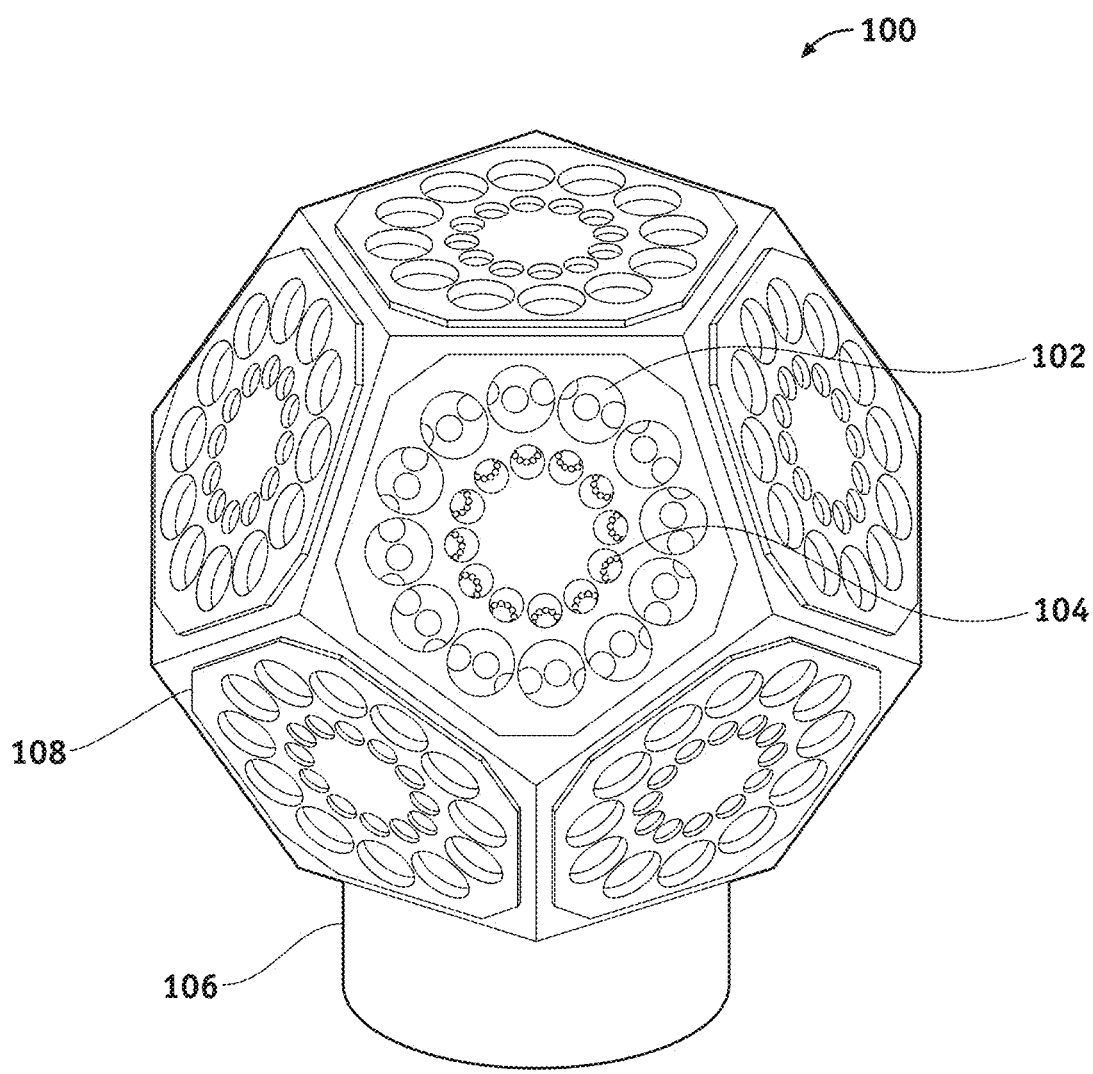
FIG. 1 shows an example of an ultrafast omnidirectional wireless data transfer device 100.

FIG. 1 illustrates an example of an ultrafast omnidirectional wireless data transfer device 100. The ultrafast omnidirectional wireless data transfer device 100 is also referred to as omnitera. The ultrafast omnidirectional wireless data transfer device includes an array of laser diodes 102. The array of laser diodes 102 operate at distinct wavelengths and are employed for near terabit per second data transmission. The ultrafast omnidirectional wireless data transfer device 100 also includes an array of fast detectors 104. The array of fast detectors 104, operating at distinct wavelengths, is used for detection of laser beams from other pairing ultrafast omnidirectional wireless data transfer device or devices. The ultrafast omnidirectional wireless data transfer device 100 further includes a connection port 106. The connection port 106 is utilized for connection of the ultrafast omnidirectional wireless data transfer device 100 to sensors, computers, and/or networks. The ultrafast omnidirectional wireless data transfer device 100 has a multifaceted geometry 108, which is suitable for achieving full spherical coverage. As used in the present disclosure, the term omnidirectional is intended to mean receiving or transmitting in all directions.

Figure 2:
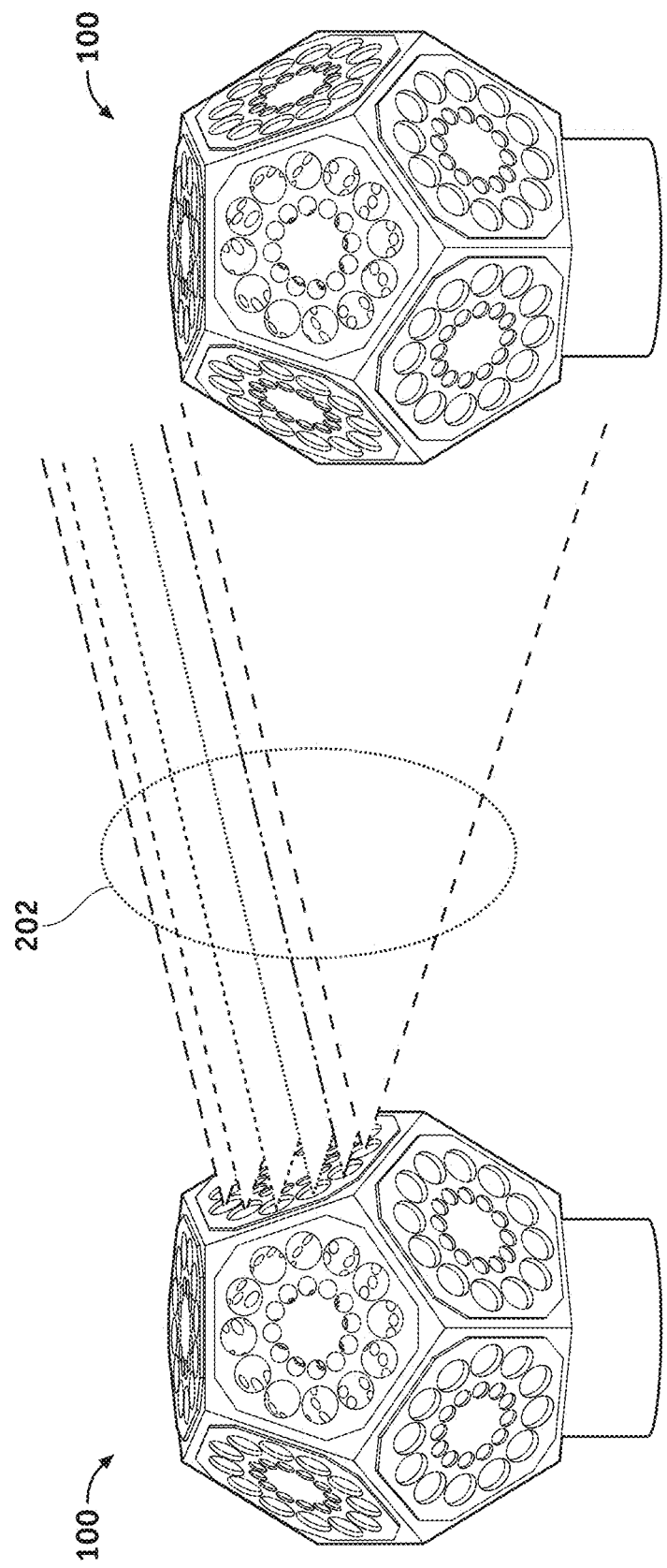
FIG. 2 shows an example of an ultrafast omnidirectional wireless data transfer system where two ultrafast omnidirectional wireless data transfer devices are shown.

FIG. 2 shows an example of an ultrafast omnidirectional wireless data transfer system where two ultrafast omnidirectional wireless data transfer devices 100 are shown. The device on the left is shown transmitting data to the device on the right using multiple laser beams 202. Data transmission utilizing multiple laser beams operating at different wavelengths allows for near terabit per second data rates.

Figure 3:
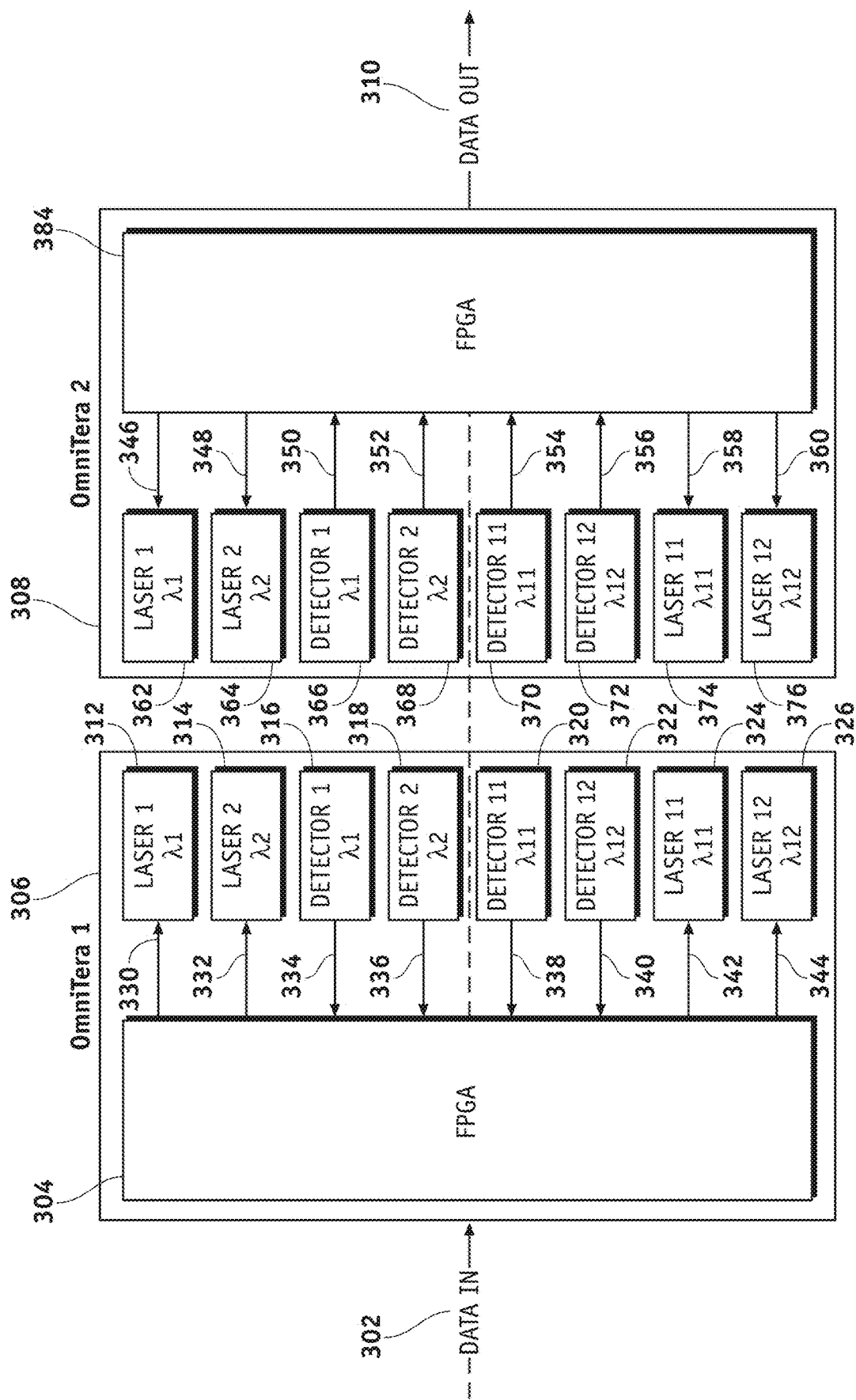
FIG. 3 shows an example of a block diagram of two ultrafast omnidirectional wireless data transfer devices, where the first ultrafast omnidirectional wireless data transfer device is in communication with the second ultrafast omnidirectional wireless data transfer device.

FIG. 3 shows an example of a block diagram of two ultrafast omnidirectional wireless data transfer devices, where the first device omnitera 1 is in communication with the second device omnitera 2. Input data 302 enters block 306 of omnitera 1 on the left side of the diagram. The block diagram 306 of the omnitera 1 includes a field programmable gate array (FPGA) 304, an array of laser diode transmitters 312, 314, 324 and 326, and an array of detectors 316, 318, 320 and 322. Each of the laser diode transmitters 312, 314, 324 and 326 operate at a different wavelength, for example laser diode transmitter 312 operates at a wavelength $\lambda_1$, laser diode transmitter 314 operates at a wavelength $\lambda_2$, laser diode transmitter 324 operates at a wavelength $\lambda_{11}$, and laser diode transmitter 326 operates at a wavelength $\lambda_{12}$. FPGA 304 provides data to each of the laser diode transmitters 312, 314, 324 and 326 via data paths 330, 332, 342 and 344, respectively. Each of the detectors 316, 318, 320 and 322 operate at a different wavelength, for example detector 316 operates at a wavelength $\lambda_1$, detector 318 operates at a wavelength $\lambda_2$, detector 320 operates at a wavelength $\lambda_{11}$, and detector 322 at a wavelength $\lambda_{12}$. FPGA 304 receives data from each of the detectors 316, 318, 320 and 322 via data paths 334, 336, 338 and 340, respectively.

In FIG. 3, omnitera 1 is shown in communication with omnitera 2. Output data 310 exits block 308 of omnitera 2 on the right side of the diagram. The block diagram 308 of the omnitera 2 includes an FPGA 384, an array of laser diode transmitters 362, 364, 374 and 376, and an array of detectors 366, 368, 370 and 372. Each of the laser diode transmitters 362, 364, 374 and 376 operate at a different wavelength, for example laser diode transmitter 362 operates at a wavelength $\lambda_1$, laser diode transmitter 364 operates at a wavelength $\lambda_2$, laser diode transmitter 374 operates at a wavelength $\lambda_{11}$, and laser diode transmitter 376 operates at a wavelength $\lambda_{12}$. FPGA 384 provides data to each of the laser diode transmitters 312, 314, 324 and 326 via data paths 346, 348, 358 and 360, respectively. Each of the detectors 366, 368, 370 and 372 operate at a different wavelength, for example detector 366 operates at a wavelength $\lambda_1$, detector 368 operates at a wavelength $\lambda_2$, detector 370 operates at a wavelength $\lambda_{11}$, and detector 372 at a wavelength $\lambda_{12}$. FPGA 384 receives data from each of the detectors 366, 368, 370 and 372 via data paths 350, 352, 354 and 356, respectively. Omnitera 1 transmits input data 302 to omnitera 2 via laser diodes 312, 314, 324 and 326. Omnitera 2 received input data 302 via detectors 366, 368, 370 and 372. Detector operating at $\lambda_n$ only receives data incoming from laser operating at $\lambda_n$.

Figure 4:
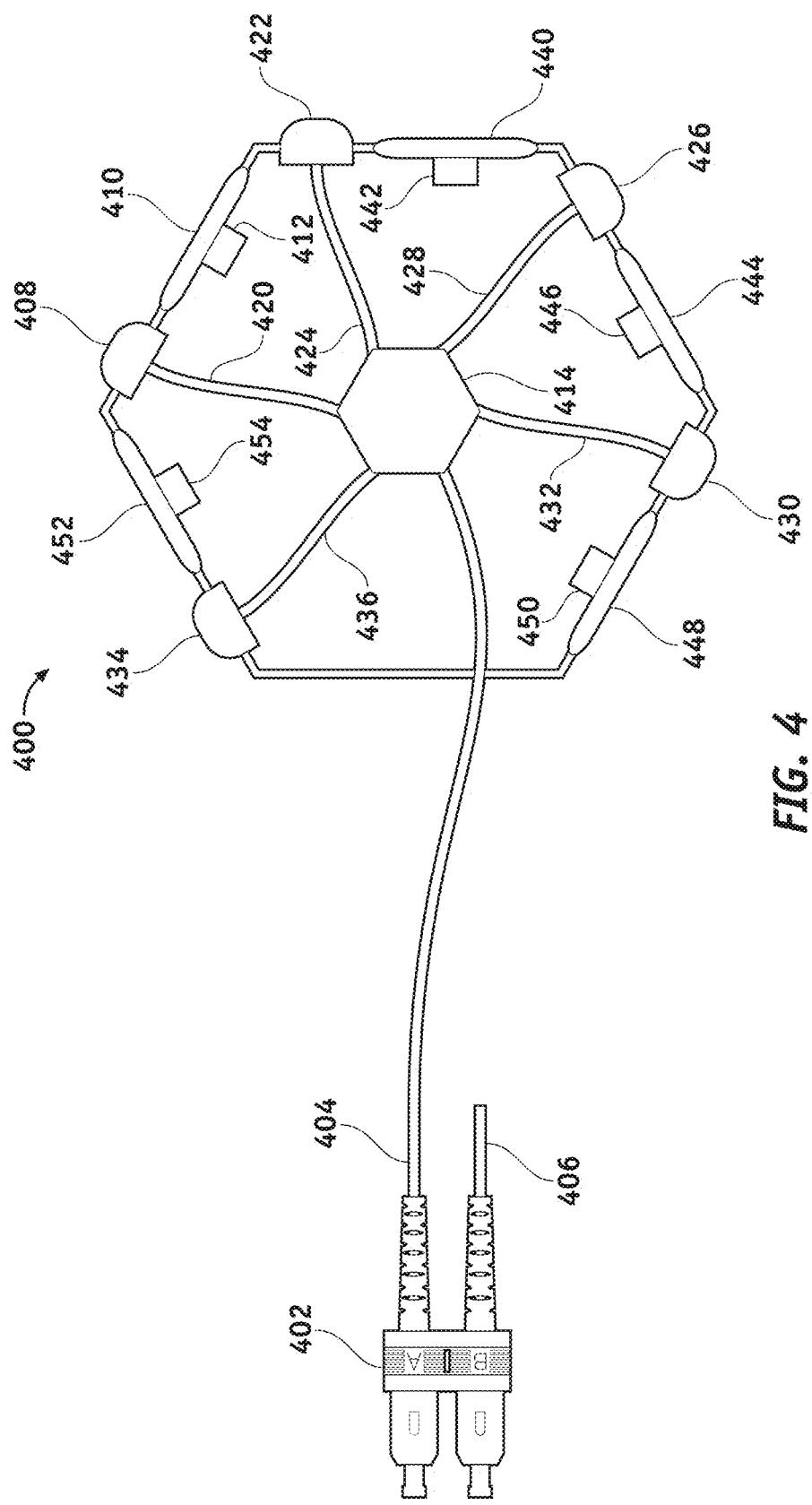
FIG. 4 shows another embodiment of an ultrafast omnidirectional wireless data transfer device 400.

FIG. 4 shows another embodiment of an ultrafast omnidirectional wireless data transfer device 400. In this embodiment, optical signals are received via an array of collimators 408, 422, 426, 430 and 434. The optical signals received by collimators 408, 422, 426, 430 and 434 are fed to suitable fibers 420, 424, 428, 432 and 436, and are subsequently combined via an optical combiner 414. The combined signal is connected via a fiber link 404 to a suitable connector such as a small form-factor pluggable (SFP) connector 402, used for connecting to a computer.

Figure 5:
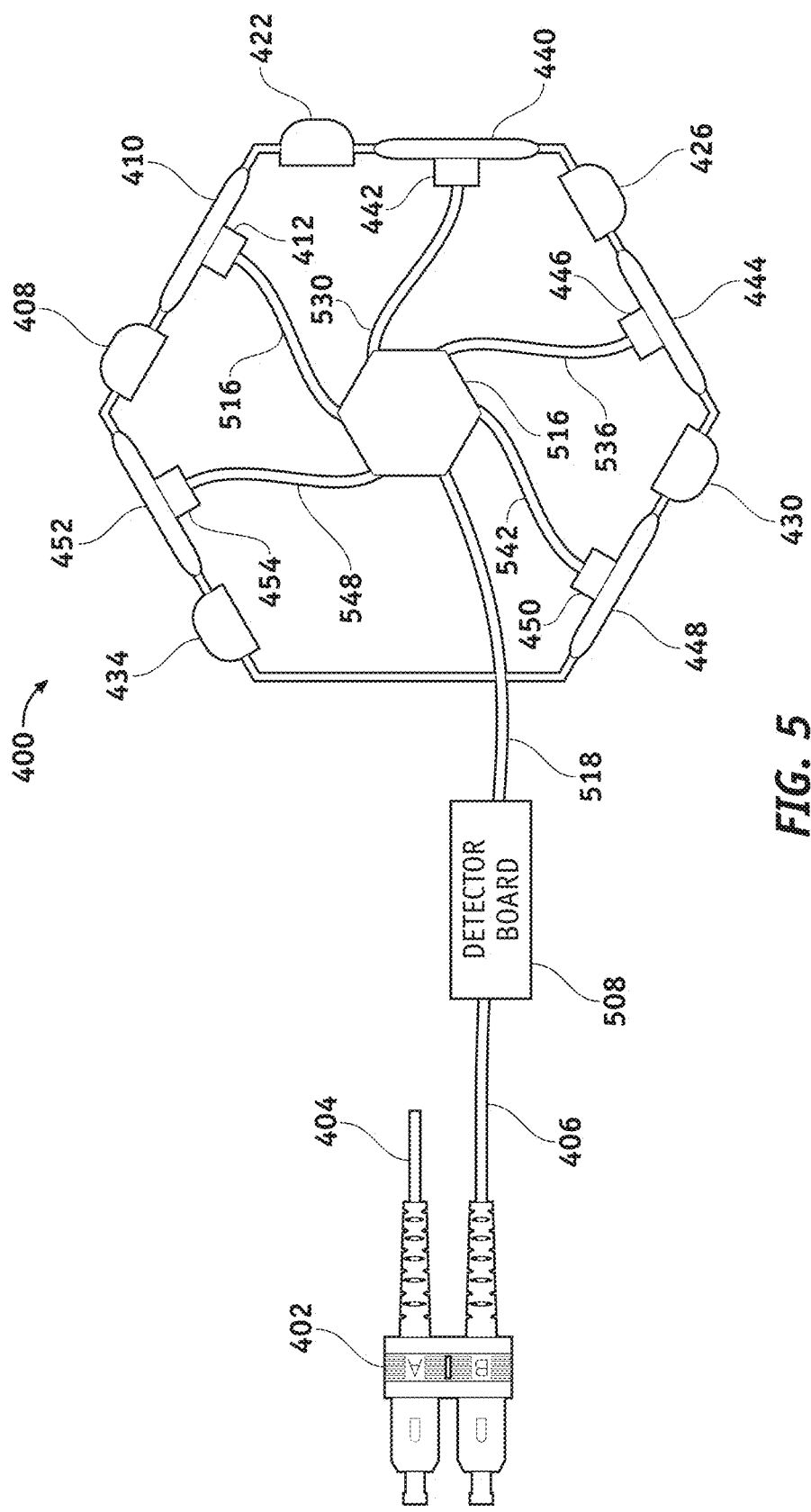
FIG. 5 illustrates the same embodiment of the disclosed device of FIG. 4, where the ultrafast omnidirectional wireless data transfer device 400 is shown with transmit components spotlighted.

FIG. 5 illustrates the same embodiment of the disclosed device of FIG. 4, where the ultrafast omnidirectional wireless data transfer device 400 is shown with transmit components spotlighted. In this embodiment, optical signals are transmitted via an array of lasers diodes 412, 442, 446, 450, and 454, and their respective diffusers 410, 440, 444, 448 and 452. An optical signal received from a computer via an SFP connector 402 is fed to a detector board 508 by an optical fiber 406, where it is converted into modulated electrical signals. The modulated electrical signals coming out of detector board 508 are fed to a radio frequency (RF) splitter 516, where the outputs of the RF splitter are fed to the laser diodes 412, 442, 446, 450, and 454 by electrical links 516, 530, 536, 542 and 548. The laser diodes 412, 442, 446, 450, and 454 produce optical signals, which are used by their respective diffusers 410, 440, 444, 448 and 452 to produce an array of optical beams with spherical coverage.

Figure 6:
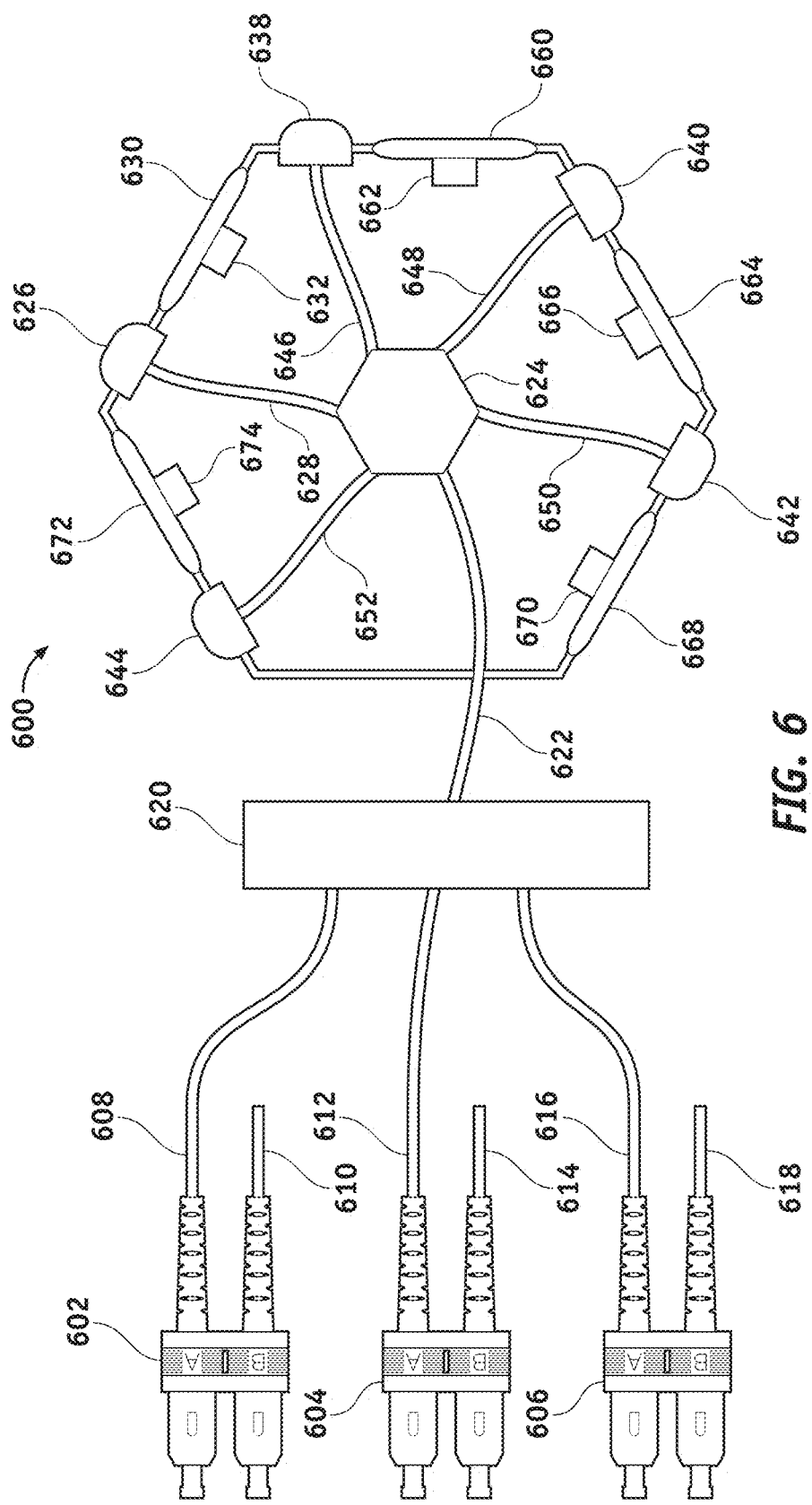
FIG. 6 shows an alternate embodiment of an ultrafast omnidirectional wireless data transfer device 600.

FIG. 6 shows an alternate embodiment of an ultrafast omnidirectional wireless data transfer device 600. In this embodiment, optical signals with different wavelengths are received via collimators 626, 638, 640, 642 and 644. The optical signals received by the collimators 626, 638, 640, 642 and 644 are fed to suitable fibers 628, 646, 648, 650 and 652, respectively, and are subsequently combined by an optical combiner 624. The combined signal passes through a demultiplexer 620 where the signal is demultiplexed based on wavelength. The outputs of the demultiplexer 620 is fed to an array of SFP connectors 602, 604 and 606 by an array of optical links 608, 612 and 616. The SFP connectors 602, 604 and 606 also include transmit fibers 610, 614 and 618, respectively. The SFP connectors 602, 604 and 606 could be connected to an SFP switch or to a computer for received signal processing. This ultrafast omnidirectional wireless data transfer device 600 also includes an array of lasers 632, 662, 666, 670 and 674, and their respective diffusers 630, 660, 664, 668 and 672.

Figure 7A:
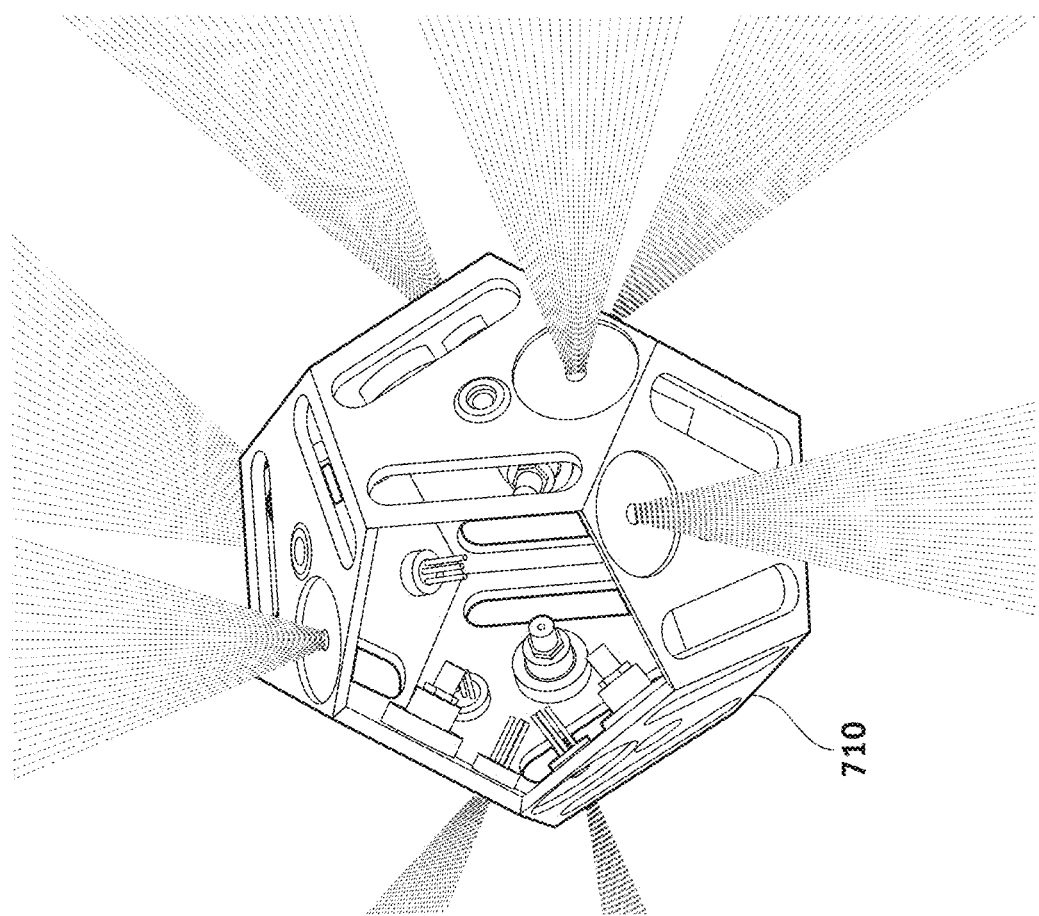
FIG. 7A shows an example of an embodiment of an ultrafast omnidirectional wireless data transfer device 710. The ultrafast omnidirectional wireless data transfer device features a multi-faceted structure using dodecahedron geometry.
Figure 7B:
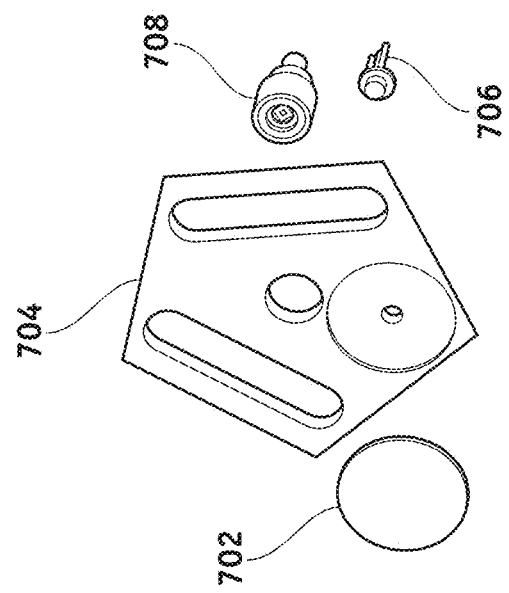
FIG. 7B shows details of each facet of the ultrafast omnidirectional wireless data transfer device of FIG. 7A.

FIG. 7A shows an example of an embodiment of an ultrafast omnidirectional wireless data transfer device 710. The omnitera features a multi-faceted structure using dodecahedron geometry. As shown in FIG. 7B, each facet of the omnitera 710 includes a photo diode 708, a laser transmitter 706, and a beam diffuser 702 connected to the laser transmitter 706, all of which are housed together in a housing panel 704. Optical signals received by the photo diodes are amplified and then combined by an RF combiner. The combined signal is connected to a suitable connector such as an SFP connector, in order to be connected to a computer. The use of diffusers allows for data transfer in omnidirectional manner leaving no blind zones.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A wireless data transfer apparatus, comprising:
   a multifaceted structure;
   a plurality of laser diodes, each laser diode of the plurality of laser diodes connected to a respective diffuser;
   an RF splitter connected to each laser diode of the plurality of laser diodes, the RF splitter configured to split an input modulated RF signal into a plurality of same RF signals respectively provided to the plurality of laser diodes; and
   a plurality of optical detectors,
      wherein the plurality of laser diodes and the plurality of optical detectors are housed in the multifaceted structure and located therein to enable data transfer in an omnidirectional manner, and
      wherein the plurality of laser diodes, each connected to the respective diffuser, in combination, generate an array of optical beams with spherical coverage for transmission of the input modulated RF signal according to the omnidirectional manner.

2. The wireless data transfer apparatus of claim 1, further comprising a connector connected to the multifaceted structure.

3. The wireless data transfer apparatus of claim 1, wherein each laser diode housed in each facet of the multifaceted structure operates at a different wavelength.

4. The wireless data transfer apparatus of claim 3, wherein each optical detector housed in each facet of the multifaceted structure operates at a different wavelength.

5. The wireless data transfer apparatus of claim 4, further comprising an FPGA, wherein the FPGA is connected to the plurality of optical detectors and laser diodes.

6. An omnidirectional wireless data transfer system comprising a group of wireless data transfer apparatuses of claim 5, wherein the wireless data transfer apparatuses are optically communicating so as to provide data transfer in an omnidirectional manner.

7. The wireless data transfer apparatus of claim 1, wherein each optical detector housed in each facet of the multifaceted structure operates at a different wavelength.

8. The wireless data transfer apparatus of claim 1, wherein the multifaceted structure has a dodecahedron shape.

9. The wireless data transfer apparatus of claim 8, further comprising an FPGA, wherein the FPGA is connected to the plurality of optical detectors and laser diodes.

10. The wireless data transfer apparatus of claim 1, further comprising an FPGA, wherein the FPGA is connected to the plurality of optical detectors and laser diodes.

11. A wireless data transfer apparatus, comprising:
   a multifaceted structure;
   a plurality of laser diodes, each laser diode of the plurality of laser diodes connected to a diffuser;
   a plurality of optical collimators, each optical collimator of the plurality of optical collimators connected to a fiber optic;
   an RF splitter connected to each laser diode of the plurality of laser diodes; and
   an optical combiner connected to each optical collimator via the optical collimator's connected fiber optic,
      wherein the plurality of laser diodes, the plurality of optical collimators, the RF splitter and the optical combiner act, in combination, to provide ultrafast data communication in an omnidirectional manner.

12. The wireless data transfer apparatus of claim 11, wherein the optical combiner is also connected to an SFP connector.

13. The wireless data transfer apparatus of claim 12, wherein the optical combiner is also connected to a demultiplexer.

14. The wireless data transfer apparatus of claim 13, wherein the demultiplexer is connected to a plurality of SFP connectors.

15. The wireless data transfer apparatus of claim 11, wherein the optical combiner is also connected to a demultiplexer.

16. The wireless data transfer apparatus of claim 11, wherein the RF splitter is also connected to a detector board.

17. The wireless data transfer apparatus of claim 16, wherein the detector board converts optical signals to electrical signals for driving the plurality of laser diodes.

* * * * *